United States Patent Office 3,766,139
Patented Oct. 16, 1973

3,766,139
THERMAL OXIDATIVELY STABLE POLY-
CARBONATE COMPOSITION
Charles A. Bialous, Mount Vernon, and Donald B. G. Jaquiss, New Harmony, Ind., assignors to General Electric Company
No Drawing. Original application Apr. 15, 1970, Ser. No. 28,988. Divided and this application July 29, 1971, Ser. No. 167,485
Int. Cl. C08g 17/13, 51/58
U.S. Cl. 260—47 XA                5 Claims

ABSTRACT OF THE DISCLOSURE

A thermal oxidatively stable polycarbonate composition consisting of the reaction product of bisphenol-A, a carbonate precursor and a minor amount of phosphorus dihalide and to a process for preparing the stable polymer composition which consists of adding 0.0005 to about 0.01 mole of a phosphorus dihalide per mole of bisphenol-A to the reaction medium.

This application is a division of U.S. patent application Ser. No. 28,988 filed Apr. 15, 1970.

This invention relates to thermal oxidatively stable polycarbonate compositions and more particularly to polycarbonate compositions having minor amounts of particular phosphorus containing compounds that are actually in the polymer chain and to a process for preparing the thermal oxidatively stable polycarbonate compositions hereafter described.

While it is known to incorporate phosphorous into a polymer chain as disclosed by U.S. Pat. 3,378,523 and in the publication by G. S. Kolesnikov et al. Vysokomol. soyed. A–9, No. 10, pages 2246–2249, 1967, none of these references discloses the use of minor amounts of phosphorous containing material to be incorporated into the polymer chain to achieve greatly enhanced thermal stability without otherwise changing the nature of the polycarbonate. Due to the use of increased molding temperatures with polycarbonate resins, the exposure of molded shapes to higher temperatures has become more important to preparing polycarbonates having increased stability to thermal degradation or discoloration when exposed to elevated temperatures. Therefore, it has been surprisingly discovered that by incorporating minor amounts of a particular phosphorous containing material into the polymer chain, thermally stable polycarbonates are obtained.

Therefore it is an object of the instant invention to provide a thermally stable polycarbonate.

Another object of this invention is to provide a thermally stable polycarbonate having minor amounts of phosphorus incorporated into the polymer chain.

Still another object of this invention is to provide a process for preparing a thermally stable polycarbonate.

These and other objects of this invention will become apparent from the following detailed description thereof.

Briefly, according to this invention, the foregoing and other objects are obtained by reacting a dihydric phenol such as 2,2-bis(4-hydroxyphenyl) propane (hereinafter referred to as bisphenol-A), a carbonate precursor and a minor amount of a phosphorous dihalide of the formula:

wherein X is a halogen atom independently selected from the group consisting of fluorine, chlorine, bromine and iodine and R is an organic radical of 1–25 carbon atoms and may be either aryl, haloaryl, alkyl, cycloalkyl, aralkyl or alkaryl radicals.

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and mechanical agitator charge 15 gallons of dry methylene chloride, 20 pounds of 2,2-bis(4-hydroxyphenyl)-propane, 18.7 pounds of calcium hydroxide, 188 grams of p-tertiary butylphenol and 4.7 ml. of triethylamine. The slurry is stirred and phosgene is added at a rate of about 13.2 pounds per hour. After 45 minutes, the endpoint is reached and the phosgene addition is terminated. The polycarbonate in solid form is recovered by filtering and evaporation of the solvent. The polycarbonate is dried for 48 hours at 225° F. and then extruded at a temperature of about 525° F. The extrudate is comminuted into pellets.

The polycarbonate is designated as I.

EXAMPLE II

To a reactor fitted with a reflux condenser and mechanical agitator, charge 15 gallons of dry methylene chloride, 20 pounds of 2,2 - bis(4 - hydroxyphenyl)-propane, 18.7 pounds of calcium hydroxide, 188 grams kg. of p-tertiary butylphenol, 4.7 ml. of triethylamine and 5.86 grams of phenylphosphonous dichloride in 25 ml. of methylene chloride. The slurry is stirred and phosgene is added at a rate of about 13.2 pounds per hour. After 45 minutes, the endpoint is reached and the phosgene addition terminated. Polycarbonate in solid form is recovered as in Example I. Elemental phosphorus content of the polycarbonate is determined by the Schöniger combustion test described in Identification and Analysis of Plastics by Haslum and Willis, Iliffe Books, London, 1965, page 8, and is found to be 0.0074 weight percent.

The polycarbonate is designated as II.

EXAMPLE III

Each of the polycarbonates I and II above of Examples I and II are molded into test samples at the temperatures so indicated in Table 1. Thermal stability to discoloration is measured using the IDL Color Eye Colorimeter in terms of APHA numbers (American Public Health Association) on the test specimens as molded and after heat aging at 140° C. for seven days. The results are as follows:

TABLE 1

| Sample | Wt. percent phosphorus | APHA 550° F. | APHA 600° F. | APHA—heat aging at 140° F., 7 days 550° F. | APHA—heat aging at 140° F., 7 days 600° F. |
|---|---|---|---|---|---|
| I | 0 | 39 | 38 | 74 | 82 |
| II | 0.0074 | 22 | 25 | 50 | 59 |

The instant invention is directed to a thermally stable polymer composition and more particularly to a thermally stable polycarbonate having incorporated into the polymer structure elemental phosphorus in an amount of 0.0005 to about 1.0 weight percent based on the total weight of the polymer. The polymer herein set forth is the residue of the condensation reaction of bisphenol-A, a carbonate precursor and a minor amount of a phosphorous dihalide as represented by the formula:

wherein in the above formula, X is a halogen atom independently selected from the group consisting of fluorine, iodine, bromine and chlorine, and R is an organic radical of 1–25 carbon atoms and may be selected from the group consisting of aryl, haloaryl, alkyl, cycloalkyl, aralkyl and alkaryl radicals. In addition, the instant invention is directed to an improved process for preparing the polycarbonates of this invention, which process consists of preparing the thermally oxidatively stable polymer by reacting bisphenol-A, a carbonate precursor and a minor amount of a phosphorous dihalide of the above formula in an organic medium, such as methylene chloride and in the presence of a catalyst, a molecular weight regulator and an acid acceptor. The amount of phosphorous containing compounds to be reacted per mole of bisphenol-A is 0.0005 to about 0.01 mole thereof.

As stated previously, the phosphorus containing compounds are typically represented by the above formula and R therein may be alkyl such as methyl, ethyl, n-propyl, isopropyl, n-butyl, sec-butyl, tertiary-butyl, n-amyl, isoamyl, tertiary amyl, n-hexyl, dodecyl, nonyl, etc., cycloalkyl such as cyclohexyl, 2-methylcyclohexyl, 4-methylcyclohexyl, 2 - ethylcyclohexyl, 4-ethylcyclohexyl, 4-isopropylcyclohexyl, etc., aryl such as phenyl, naphthyl, 1-naphthyl, 2-naphthyl, biphenyl, terphenyl, etc.; haloaryl such as 2-chlorophenyl, 2,4,6-trichlorophenyl, 2,4,6-tribromophenyl, etc.; aralkyl such as benzyl, phenyl-ethyl, 2-phenyl-ethyl, 1-phenyl-propyl, 2-phenylpropyl, etc.; and alkaryl such as p-tolyl, m-tolyl, o-tolyl, 2,6-xylyl, p-cumyl, m-cumyl, mesityl, p-tertiary butylphenyl, etc. In place of the phenyl phosphorous dichloride employed in the examples, chloromethylphosphorous dichloride has been used with essentially the same results. In the practice of this invention, the preferred phosphorous dihalide is phenyl phosphorous dichloride.

The dihydric phenols that can be employed herein to prepare the copolymer of this invention are bisphenols such as bis(4 - hydroxyphenyl) methane, 2,2-bis(4 - hydroxyphenyl) propane, 2,2-bis(4-hydroxy-3-methylphenyl) propane, 4,4-bis(4-hydroxyphenoyl) heptane, 2,2-bis-(4-hydroxy - 3,5 - dichlophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro-4,4'-dihydroxydiphenyl, etc. dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pats. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be a hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarylbutylphenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermal oxidatively stable polycarbonate composition which is the residue of the condensation reaction of bisphenol-A, a carbonate precursor and 0.0005 to about 0.01 mole per mole of bisphenol-A of a phosphorous dihalide of the formula:

wherein X is a halogen atom independently selected from the group consisting of fluorine, chlorine, bromine and iodine and R is an organic radical selected from the group consisting of aryl, haloaryl, alkyl, cycloalkyl, aralkyl and alkaryl radicals of 1–25 carbon atoms.

2. The composition of claim 1 wherein the polymer composition contains therein 0.0005 to about 1.0 weight percent of elemental phosphorus.

3. The composition of claim 1 wherein the phosphorous dihalide is phenyl phosphorous dichloride.

4. In a process for preparing a thermal oxidatively stable polymer by reacting bisphenol-A with a carbonate precursor in the presence of an acid acceptor, a catalyst and a molecular weight regulator, the improvement which consists of adding to the reaction medium 0.0005 to about 0.01 mole per mole of bisphenol-A of a phosphorous dihalide of the formula

wherein X is a halogen atom independently selected from the group consisting of fluorine, chlorine, bromine and iodine and R is an organic radical selected from the group consisting of aryl, haloaryl, alkyl, cycloalkyl, aralkyl and alkaryl radicals of 1–25 carbon atoms.

5. The process of claim 4 wherein the additive is phenyl phosphorous dichloride.

References Cited
UNITED STATES PATENTS

| | | | |
|---|---|---|---|
| 3,378,523 | 4/1968 | Caldwell et al. | 260—47 |
| 3,578,634 | 5/1971 | Bailous et al. | 260—47 |
| 3,634,312 | 1/1972 | Babillis et al. | 260—47 |

WILBERT J. BRIGGS, SR., Primary Examiner

U.S. Cl. X.R.

260—45.7 P, 49